May 12, 1925.
M. F. CROSBY
1,537,804
LAWN MOWER
Filed Aug. 27, 1924 2 Sheets-Sheet 1
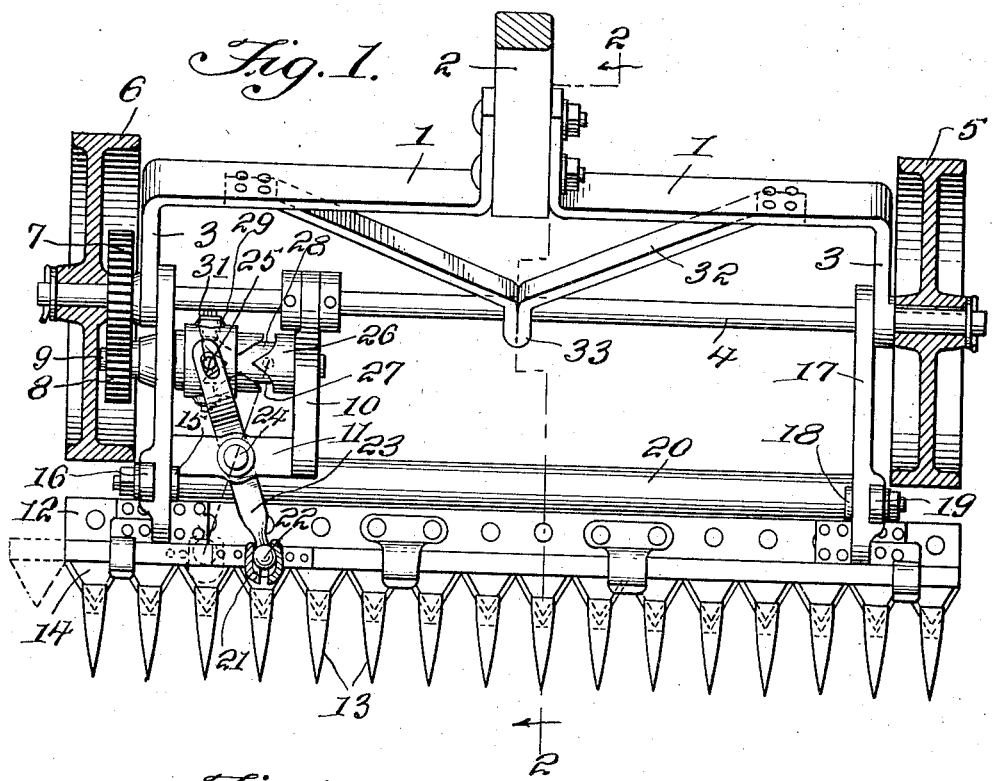
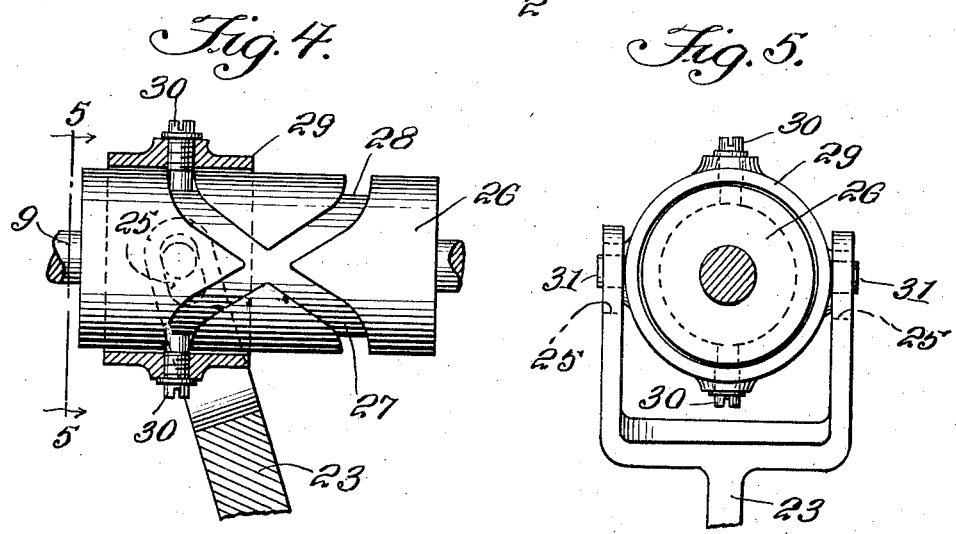
Martin Franklin Crosby
INVENTOR
BY Victor J. Evans
ATTORNEY
WITNESS: J. T. L. Wright May 12, 1925.  
M. F. CROSBY  
LAWN MOWER  
Filed Aug. 27, 1924  
1,537,804  
2 Sheets-Sheet 2
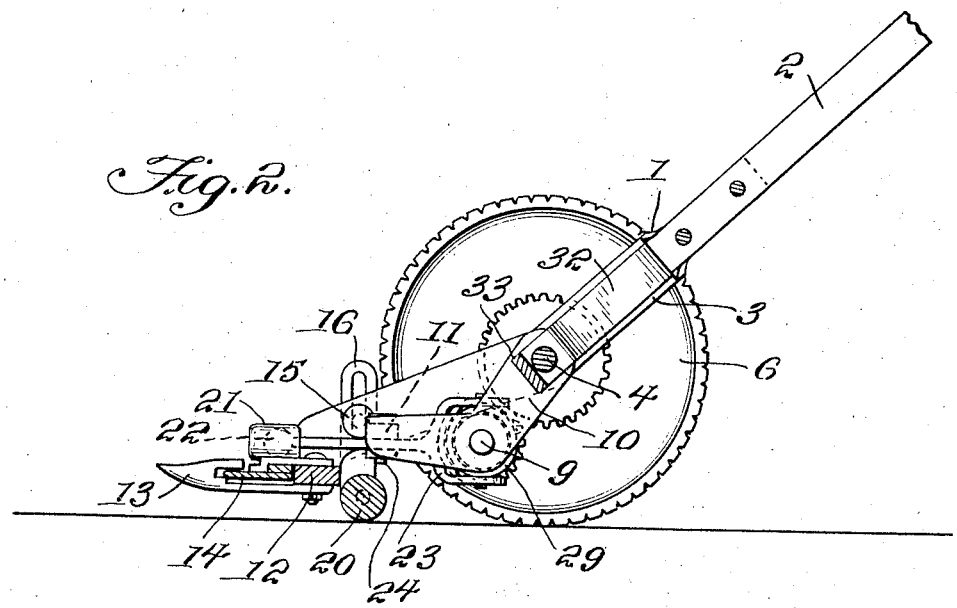
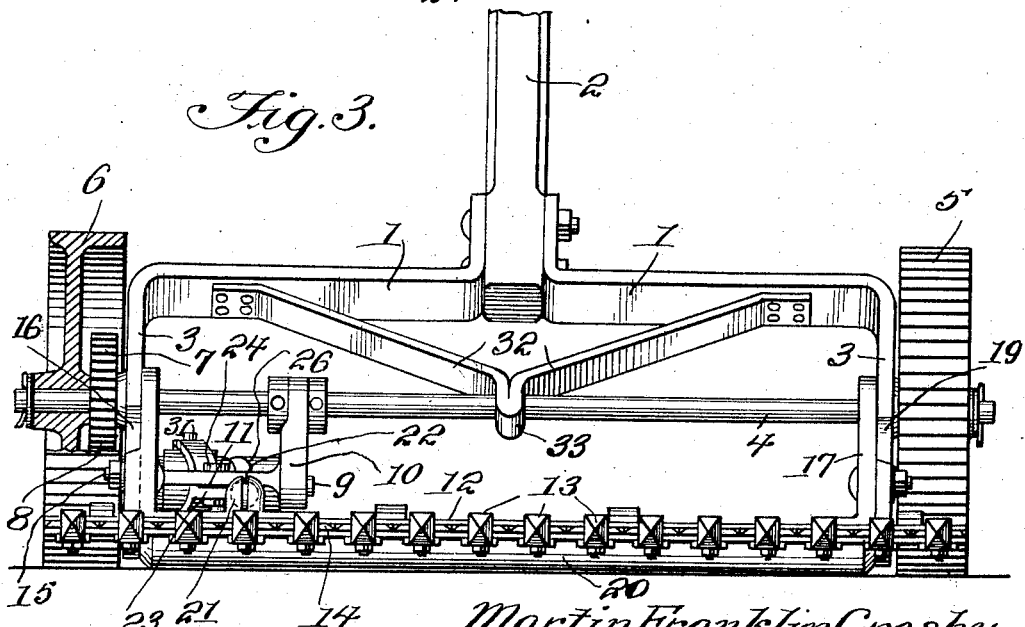
Martin Franklin Crosby
INVENTOR
WITNESS: J. L. Wright
BY Victor J. Evans
ATTORNEY Patented May 12, 1925.

1,537,804

UNITED STATES PATENT OFFICE.

MARTIN FRANKLIN CROSBY, OF MOUNT BERRY, GEORGIA.

LAWN MOWER.

Application filed August 27, 1924. Serial No. 734,507.

*To all whom it may concern:*

Be it known that I, MARTIN FRANKLIN CROSBY, a citizen of the United States, residing at Mount Berry, in the county of Floyd and State of Georgia, have invented new and useful Improvements in Lawn Mowers, of which the following is a specification.

My present invention has reference to an improved lawn mower.

My primary object is the provision in a lawn mower of simple means for imparting a free reciprocatory movement to the knife bar without liability of clogging.

A further object is the construction of a mower machine in which the parts are interchangeably associated and also in which the construction is simple so that the same may be cheaply manufactured and marketed, and further wherein the mower may be operated in an easy and thoroughly efficient manner.

Other objects and advantages will present themselves as the nature of the invention is better understood, reference is to be had to the drawings which accompany and form part of this application.

In the drawings:—

Figure 1 is a plan view of the improvement, the ground wheels as well as the handle being in section.

Figure 2 is a sectional view on the line 2—2 of Figure 1.

Figure 3 is a front elevation with parts broken away and parts in section.

Figure 4 is a fragmentary enlarged sectional view to illustrate the roller provided with the double cam slot which actuates the pitman for the slidable cutter bar.

Figure 5 is a sectional view approximately on the line 5—5 of Figure 4.

My improved lawn mower is of the sickle type, and as disclosed by the drawings embodies a substantially U-shaped frame. The frame is preferably made up of two angle sections, each indicated by the numeral 1, the confronting ends of the said sections being offset and having arranged therebetween and secured thereto the operating handle 2. The inner angle arms 3 of the frame are provided with bearing openings for the drive shaft 4. The drive shaft has fixed on one of its ends a ground wheel 5 and has loosely secured at its opposite end a second ground wheel 6. Fixed on the shaft, inward of the loose ground wheel 6 there is a toothed wheel 7 that is in mesh with a pinion 8. The pinion is fixed on a shaft 9 that is journaled in bearings in an auxiliary substantially U-shaped frame 10, the side arms of which being pivotally supported by the shaft 4, and one of the said side arms being extended beyond the front 11 and secured to the support 12 for the finger bar 13 and for the cutter bar 14 that is designed to reciprocate on the finger bar. The last mentioned arm of the auxiliary frame carries a headed binding element 15 which passes through and which has its head designed to frictionally engage with a slotted bracket 16. The auxiliary frame also includes an arm 17 which is likewise pivotally supported on the shaft 4. The arm 17, like the first mentioned end arm of the auxiliary frame, is connected to the support 12 for the finger bar 13, and the said arm 17 has guided in the outer side thereof a slotted bracket 19. The bracket is adjustably held on the arm 17 by an adjustable binding element 18. The bracket is indicated by the numeral 19, and the brackets 16 and 19 have journaled in their lower ends the trunnions of a roller 20. What I have referred to as the binding elements for the brackets are really in the nature of nuts and bolts, and by such arrangement it will be noted that the roller 20 may be adjusted so that the sickle bar may be regulated with respect to the ground surface and the cut made thereby likewise regulated.

As the sickle bar does not form part of this invention a detailed description thereof will not be attempted, although it is necessary to state that the bar to which the cutting knives are connected carry an upstanding socket 21. In this socket there is freely received the ball head 22 on a lever 23. The lever is approximately centrally pivoted, as at 24, to the outer element 11 of what I have termed the auxiliary frame. The free end of the lever is provided with an elongated slot 25. On the shaft 9, between the parallel arms of the auxiliary frame there is fixed a roller member 26. This roller is peripherally formed with a double cam slot, that is, with two slots which centrally intersect each other, and for distinction these slots are indicated by the numerals 27 and 28 respectively. The roller is surrounded by a sleeve 29. The sleeve is formed with oppositely directed bosses that surround threaded openings, and screwed in each of these openings there is a plug 30. The plugs enter the respective grooves 27 and 28. At points centrally between the plugs 30 the sleeve 29 is formed with outstanding studs 31. It should have been stated that the inner end of the lever 23 is bifurcated so that the arms thereof will straddle the sleeve 29 and through each of the elongated slots 25 on the said arms of the lever the respective studs 31 pass.

Secured to the frame 1 there are the angle arms 32 of a brace member. The brace member is formed with a single strip of metal and has its central portion offset or projected to provide what I will term a lip 33. This lip has an opening therethrough, and through the opening passes the shaft 4. By such arrangement it will be noted that the frame is reinforced and the central portion of the shaft is effectively supported.

The operation of the device will, it is thought, be apparent. The loose wheel permits the free turning of the device when desired. The double cam roller 26 being constantly revolved upon the turning of the ground wheels will impart a rapid oscillatory movement to the lever 23 which, being loosely connected to the bar carrying the cutter knives will impart a like movement thereto. The depth of the cut may be regulated as previously described, and it is thought that the foregoing description, when taken in connection with the drawings will fully set forth the construction of my improvement and its advantages to those skilled in the art to which such inventions relate.

Having described the invention, I claim:—

1. A lawn mower of the sickle type including a substantially U-shaped frame and a handle centrally connected to the frame, a shaft journaled through the parallel arms of the frame, a fixed wheel on one end of the shaft, a loose wheel on the opposite end of the shaft, an auxiliary frame pivotally supported on the shaft and carrying the finger bar and the reciprocating knife bar of the sickle, a double cam grooved roller journaled in the auxiliary frame, a sleeve on the cam roller having pins entering the grooves thereof, a lever pivotally secured to the auxiliary frame, having a forked end straddling and loosely associated with the sleeve, a ball on the outer end of the lever, a socket on the knife bar of the sickle in which the ball end is received, and means operable upon the turning of the wheels for revolving the cam roller.

2. In a lawn mower of the sickle type, a substantially U-shaped frame having a handle centrally secured thereto, a shaft journaled freely through the parallel sides of the frame, a fixed wheel on one end of the shaft and a loose wheel on the opposite end thereof, a toothed wheel fixed on the shaft adjacent to the loose wheel, an auxiliary frame pivotally supported on the shaft and carrying the finger bar and the reciprocatory knife bar of the sickle, a shaft journaled in the auxiliary frame having a pinion meshing with the toothed wheel, a roller having a double cam groove fixed on the last mentioned shaft, a sleeve surrounding the roller, adjustable means thereon for entering the cam grooves in the roller, a lever pivoted to the auxiliary frame having a forked end straddling the sleeve and loosely associated therewith, said lever having its outer end formed with a ball head, a socket on the knife bar of the sickle in which the ball head is freely received, a ground roller, and means for adjusting the same with respect to the finger and knife bars.

In testimony whereof I affix my signature.

MARTIN FRANKLIN CROSBY.